March 18, 1941.   R. PYZEL   2,235,166
PRODUCTION OF GAS MIXTURES FOR CATALYST REACTIVATION
Original Filed Feb. 8, 1937
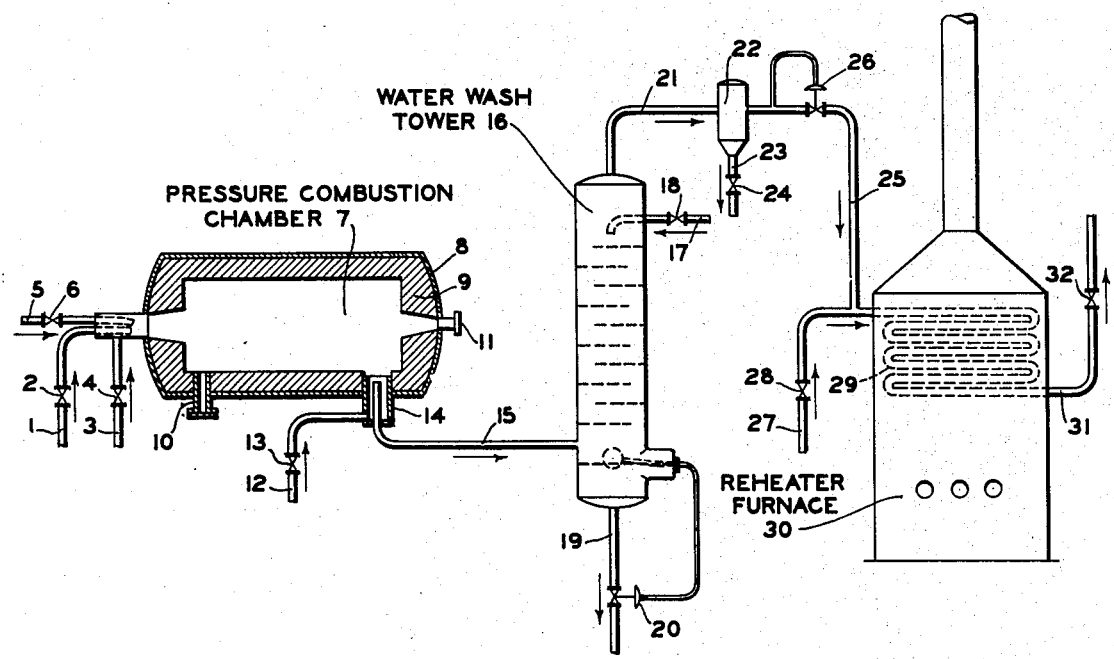
INVENTOR
ROBERT PYZEL
BY *Lee J Gary*
ATTORNEY Patented Mar. 18, 1941

2,235,166

UNITED STATES PATENT OFFICE 2,235,166

PRODUCTION OF GAS MIXTURES FOR CATALYST REACTIVATION

Robert Pyzel, Chicago, Ill., assignor to Universal Oil Products Company, Chicago, Ill., a corporation of Delaware Original application February 8, 1937, Serial No. 124,563. Divided and this application December 31, 1937, Serial No. 182,670

5 Claims. (Cl. 252—242)

This application is a division of my co-pending application, Serial No. 124,563, filed February 8, 1937, which in turn is a continuation-in-part of my application, Serial No. 52,203, filed November 29, 1935, and has particular reference to the use of gas mixtures relatively low in both oxygen and moisture content in reactivating catalytic materials which have been employed in hydrocarbon or other organic conversion reactions and which have become fouled by the deposition of carbonaceous residues which render the catalyst particles relatively inert.

More specifically the invention has reference to the use of these gas mixtures for the reactivation of a particular type of granular catalyst which has become spent in effecting polymerization and/or alkylation reactions among olefinic hydrocarbons such as those occurring in the gas mixtures produced by cracking of petroleum hydrocarbons.

The gradual depreciation of solid catalysts employed to accelerate miscellaneous organic reactions is a matter of common observation. The loss in activity is largely attributable to the deposition of tarry or carbonaceous substances on the catalytic surfaces. A suitable expedient for restoring the activity of such deteriorated catalytic materials is to oxidize the carbonaceous deposits by means of air or oxygen or other oxidizing gas mixtures, at temperatures corresponding to a practical and controllable rate of oxidation.

In the restoration of granular catalysts in situ by means of air, it is frequently impossible to control the temperature within a proper range owing to the difficulty in dissipating the heat of combustion, particularly when the deteriorated catalyst is contained in treating towers or tubes of considerable diameter, say from six inches to several feet. While small scale control tests may include the possibility of ready reactivation by air alone, because of the relatively large radiation losses from the small equipment used, it has been observed that comparable results are not obtainable in commercial equipment owing to the impossibility of holding the temperature below a prescribed maximum, above which sintering or fluxing or changes in the chemical composition of the catalyst occur so that its structure and catalytic effectiveness are permanently impaired.

In one specific embodiment the present invention comprises the restoration of the activity of spent granular catalysts and particularly solid phosphoric acid catalysts which have become coated with carbonaceous deposits after use in hydrocarbon reactions by passing thereover combustion gases of graded oxygen content produced by burning hydrocarbon fuels under pressure with increasing amounts of excess air and containing less than 5% by volume of water vapor, followed by steaming at lower temperatures than those employed in the oxidizing step to rehydrate the active constituent of the catalyst to a definite point.

In the present process combustion gas mixtures containing a low oxygen and a low water content are initially generated by burning gaseous or liquid hydrocarbon fuels under super-atmospheric pressure in the presence of limited quantities of air followed by cooling and dehumidifying the gas mixture by washing with water and then reheating for use in burning off the carbonaceous deposits from the catalyst. As in my previous application already referred to the oxygen content of the gas mixture first employed in the case of highly carbonized catalysts such as the spent phosphoric acid catalysts mentioned is considerably below 1% and this percentage is raised gradually by increasing the air:fuel ratio until substantially air alone is finally used to insure the complete removal by burning of the carbonaceous deposits, the water vapor content of the gas mixtures being maintained at all times below 5% and preferably below 3%. The steps in the production of these low oxygen and low moisture content gases may be illustrated by a description in connection with a particular operation and for the description of this operation the attached drawing has been provided which shows in essential detail by the use of conventional figures in side elevation and vertical cross section, arrangements of apparatus in which the process of producing the regenerating gas mixtures may be conducted.

Referring to the diagrammatic drawing, a pressure combustion chamber followed by a water-wash tower and a final heater for bringing the oxygen containing gas mixture up to the proper temperature for use at different stages in the reactivation process is shown. The combustion gas generator and method may conveniently be that shown and described in my application, Serial No. 171,996, filed October 30, 1937.

The pressure combustion chamber 7 consists preferably of a steel shell 8 lined with refractory material 9 and the chamber is of cylindrical shape to embody the safest construction for pressure operation. Fuel for the combustion is admitted through line 1 containing control valve 2, and air necessary for combustion is admitted through line 3 containing control valve 4 into the annular space surrounding the fuel line. A small port 10 is provided for the insertion of a torch for initiating combustion and a sight glass 11 is provided for direct visual observation of the character of the combustion taking place in the chamber. Water or steam may be introduced through line 5 containing control valve 6 to control the temperature in the combustion chamber so that overheating of the refractory lining may be avoided in the initial combustion stage wherein substantially no excess air is used. In accordance with the present invention the amount of excess air is gradually increased while the fuel burned is gradually decreased so that after the primary stages corresponding to the production of combustion gases of relatively low oxygen content, the combustion gas mixture is relatively cool and there is little danger of overheating the refractory lining of the combustion chamber. The fuel in a sense may thus be looked upon as a means of lowering the oxygen content of air which is finally employed in the final stages of catalyst reactivation. Thus at some definite point which will depend upon numerous factors such as the character of the fuel burned, rate of combustion, etc., the use of water or steam may be discontinued.

The gases produced in the combustion chamber up to a definite point in a reactivating run contain considerable quantities of steam, not only by reason of the steam or water purposely introduced into the combustion chamber, but also because of the steam formed as a result of the oxidation of the hydrogen in the hydrocarbon fuel. The water content of these gases is then reduced to below 5% by direct contact with cold water. Part of the cooling water is applied to the combustion gases leaving the combustion chamber through line 15. This part of the cooling water is introduced through line 12 containing control valve 13 and enters the outlet of the combustion chamber at the jacket 14 overflowing into line 15 and passing in combination with the combustion gases to the water wash tower 16. Cooling at this point is desirable in the primary stages of a run in that it protects the steel outlet connection of the combustion chamber, the lines leading from the combustion chamber to the water wash tower, and the lower section of the water wash tower, against excessive temperatures. The amount of cooling water introduced at this point must be sufficient to obtain temperatures at which the steel lines are unaffected. Final cooling of the combustion gases is accomplished by countercurrent water washing in water wash tower 16. The final cooling water used enters the water wash tower 16 through line 17 containing control valve 18 and flows downward countercurrent to the rising combustion gases, over a series of trays or other surface-providing power packing. The water introduced through lines 5, 12 and 17, and the condensed water of combustion is discharged at the bottom of the water wash tower through line 19 containing control valve 20 which is actuated by the water level in the bottom of the water wash tower.

The cooled combustion gases leave the water wash tower 16 through line 21, pass through trap 22 which serves to catch any entrained water (which may be drained through line 23 containing control valve 24), and flows through automatic back pressure control valve 26, through line 25 to the reheater furnace 30.

The countercurrent cooling of the combustion gases will reduce the temperature of these gases to below 100° F. while the pressure is of the order of 30 to 40 pounds per square inch. Under these conditions the percentage of water vapor in the gases leaving the top of tower 16 will not exceed 5% by volume, even in the initial stages of a run when substantially no excess air is being used.

The dehumidified gases leaving the water wash tower are now heated to any desired temperature which may have been found most suitable for initiating and maintaining the oxidation of the carbonaceous material deposited on the spent catalyst granules. As an auxiliary means of control in addition to varying the air-fuel ratio in the primary combustion, air may be added by way of line 27 containing valve 28 prior to the passage of the reactivating gas mixture through heating coil 29 arranged in furnace 30. From an economical standpoint it has been found that the overall advantages which might seem to accrue from employing the excess heat of the combustion gases to reheat them by indirect contact exchanges after their dehumidifying, is not warranted so that it is preferred to cool and dehumidify them as shown and reheat in an auxiliary furnace. By this system the controls are all positive and the combustion chamber and other parts of the equipment are not complicated by the addition of heat exchangers. It is to be understood, however, that in very large installations, the use of heat exchange may be advisable for economic reasons. The finally prepared combustion gas mixture passes through line 31 containing valve 32 to the service for which they are required.

In reactivating spent solid phosphoric acid catalysts which have a lowered efficiency due to the deposition of carbonaceous residues it has been found, as shown in my application Serial No. 52,203, filed November 29, 1935, that it is necessary to start with gas mixtures of extremely low oxygen content in burning off these carbonaceous materials, otherwise the heat of combustion of the carbonaceous deposits on the catalyst raises the temperature to such a high point that permanent damage to the catalyst results. As a basis for the invention disclosed in my application, Serial No. 124,563 filed February 8, 1937, it was shown that in addition to the need for these low oxygen content gases in the primary states of reactivation, there is a further definite need for having a minimum of moisture present in the reactivating gases. Although difficult to explain on a theoretical basis, it has been consistently observed that when the moisture content of gases used for reactivating solid phosphoric acid catalyst is of the order of 15-20% (usual moisture content of combustion gases due to oxidation of the hydrogen in the fuel) there is a permanent loss in activity of the reactivated catalyst which is considerably greater than that observed when utilizing very low moisture content gases. This loss of activity is apparently due to actual loss of phosphoric acid.

The present application contrasts with application Serial No. 124,563 mentioned in that instead of increasing the oxygen content of the reactivating gas mixture by addition of air while maintaining a uniform combustion with substantially no excess air, the reactivating gas mixture is varied in oxygen content by either increasing the excess air employed in the combustion or decreasing the fuel burned or by manipulation of both fuel and air.

The graded oxygen and low moisture content flue gas mixtures generated by the present process are applicable to the reactivation of any type of catalyst which is affected adversely by the use of combustion temperatures above a fixed maximum and is particularly applicable to the restoration of materials, the active constituent of which is affected by the presence of water vapor during reactivation. In the case of the solid phosphoric acid catalysts which are typical of catalysts which require both control of oxygen and water vapor content, it has been found that best results are obtained in reactivating when the moisture content of the reactivating gas mixture is kept below 5% and the active phosphoric acid constituent is brought back to its most effective composition (state of hydration) by subsequent steaming, usually at temperatures within the range of 450–550° F., which serves to replace the water of hydration of the catalyst lost during the oxidation of the carbonaceous deposits.

The following example is given to indicate the comparative effectiveness of utilizing gas mixtures with a moderately high moisture content (16%) and a very low moisture content (3%) on a spent solid phosphoric acid catalyst which had been used for polymerizing propylene.

*Reactivation of catalyst with dry and wet combustion gases*

|  | Dried combustion gas containing 3% steam | Combustion gases containing 16% steam |
|---|---|---|
| Catalyst activity, fresh | 83 | 83 |
| Catalyst activity, spent | 18 | 18 |
| Catalyst activity after burning at 1000° F | 40 | 0 |
| Burned and steamed 16 hours at 475° F | 142 | 95 |
| Weight loss after reactivation percent | 12 | 18 |

The gas mixtures for the reactivation runs were made by the process previously described by gradually cutting down the amount of hydrocarbon gas introduced into the combustion chamber while substantially maintaining the amount of air fed so that the oxygen content of the emergent gas mixture gradually increased from an original percentage of approximately 0.5% by volume based on the dry gas mixture to the oxygen content of air. In the later stages of the combustion, when the percentage of moisture dropped below 3%, the dehumidifying step was omitted.

In the above tabulation the same maximum temperature of 1000° F. was used in the burning and also the same time and the same amount of oxygen per pound of spent catalyst. The activities were based on a standard activity test and indicate that when burning with the dehumidified gases followed by steaming after the burning, the activity of the reactivated catalyst was much higher than the original, while only a slight increase was noted when gases containing a relatively high moisture content were used in reactivating the spent catalyst. It is also to be observed that there was a greater weight loss when the higher moisture content gases were used.

The character of the present invention and its utility have been shown respectively by the foregoing specification and the example introduced although the proper scope of the invention is not limited in exact correspondence with the descriptive or numerical sections.

I claim as my invention:

1. In the burning of objectionable carbonaceous material from solid phosphoric acid catalysts by contacting the catalyst with heated combustion gases of regulated oxygen content insufficient to raise the catalyst to an injurious temperature, the method which comprises initially generating said combustion gases by the burning of fuel with substantially no excess of air whereby to produce combustion gases substantially devoid of free oxygen, cooling the combustion gases sufficiently to reduce the water vapor content thereof to below 5% by volume, heating the dehumidified gases to the ignition temperature of the carbonaceous material on the catalyst and then introducing them into contact with the catalyst, gradually increasing the oxygen content of the gases being contacted with the catalyst by reducing the ratio of fuel to air in the aforesaid fuel burning step, and continuing the contacting of the catalyst with the dehumidified oxygen-containing gases until the objectionable carbonaceous material has been substantially burned off the catalyst.

2. The method as defined in claim 1 further characterized in that said ratio of fuel to air is reduced by lowering the fuel supply to the fuel burning step while maintaining the air supply thereto substantially constant.

3. The method as defined in claim 1 further characterized in that said ratio of fuel to air is reduced by increasing the air supply to the fuel burning step while maintaining the fuel supply thereto substantially constant.

4. The method as defined in claim 1 further characterized in that the burning of the carbonaceous material from the catalyst is effected at temperatures not substantially in excess of 1000° F.

5. The method as defined in claim 1 further characterized in that the combustion gases are cooled and dehumidified by contacting the same with water.

ROBERT PYZEL.